United States Patent [19]

Stedman

[11] 4,121,875

[45] Oct. 24, 1978

[54] TWO-COMPONENT TRACK SHOE

[75] Inventor: Robert N. Stedman, Chillicothe, Ill.

[73] Assignee: Caterpillar Tractor Co., Peoria, Ill.

[21] Appl. No.: 827,901

[22] Filed: Aug. 26, 1977

[51] Int. Cl.$^2$ .............................................. B62D 55/28
[52] U.S. Cl. ......................................... 305/39; 305/54
[58] Field of Search .............................. 305/51, 53–55, 305/35 R, 35 EB, 39–50, 60; 301/44 T; 74/247; 152/180, 182, 187, 199

[56] References Cited

U.S. PATENT DOCUMENTS

| 2,028,346 | 1/1936 | Panzegrau | 305/51 |
| 2,177,936 | 10/1939 | Esters | 305/51 |

*Primary Examiner*—Robert B. Reeves
*Assistant Examiner*—John P. Shannon
*Attorney, Agent, or Firm*—Phillips, Moore, Weissenberger, Lempio & Majestic

[57] ABSTRACT

An endless track assembly comprises a plurality of two-component track shoes pivotally interconnected by a link assembly secured thereto. The link assembly comprises a plurality of links with each track shoe being releasably secured to each pair of laterally spaced links by a plurality of bolts. Each track shoe comprises a base having a pair of laterally spaced supports disposed in upstanding relationship thereon and a track plate disposed on the supports. A lug is disposed on each lateral side of the track shoe and a bolt extends through the track plate, each of the supports and each link for releasably securing the track shoe to the link assembly.

15 Claims, 5 Drawing Figures

U.S. Patent    Oct. 24, 1978    4,121,875
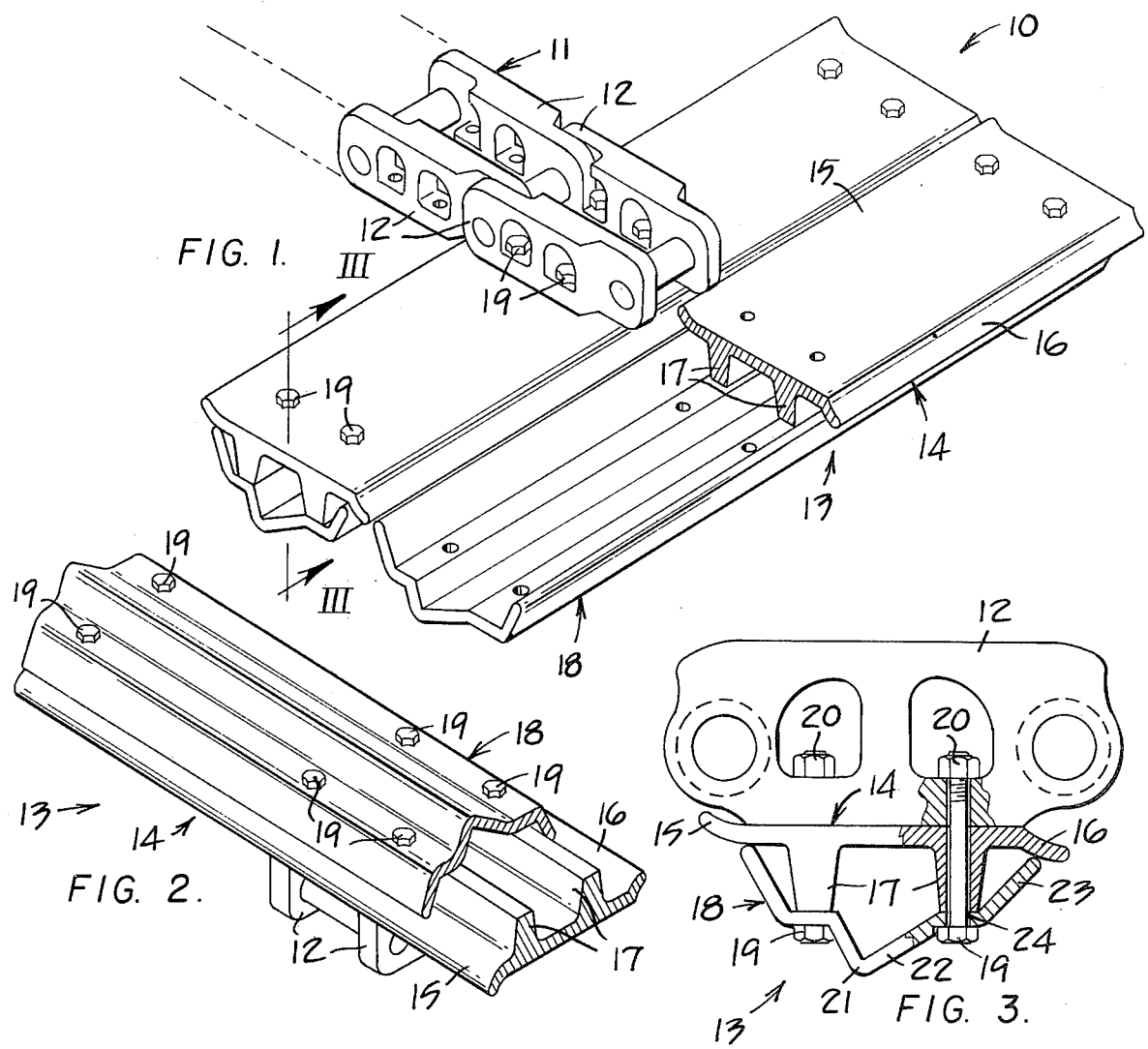
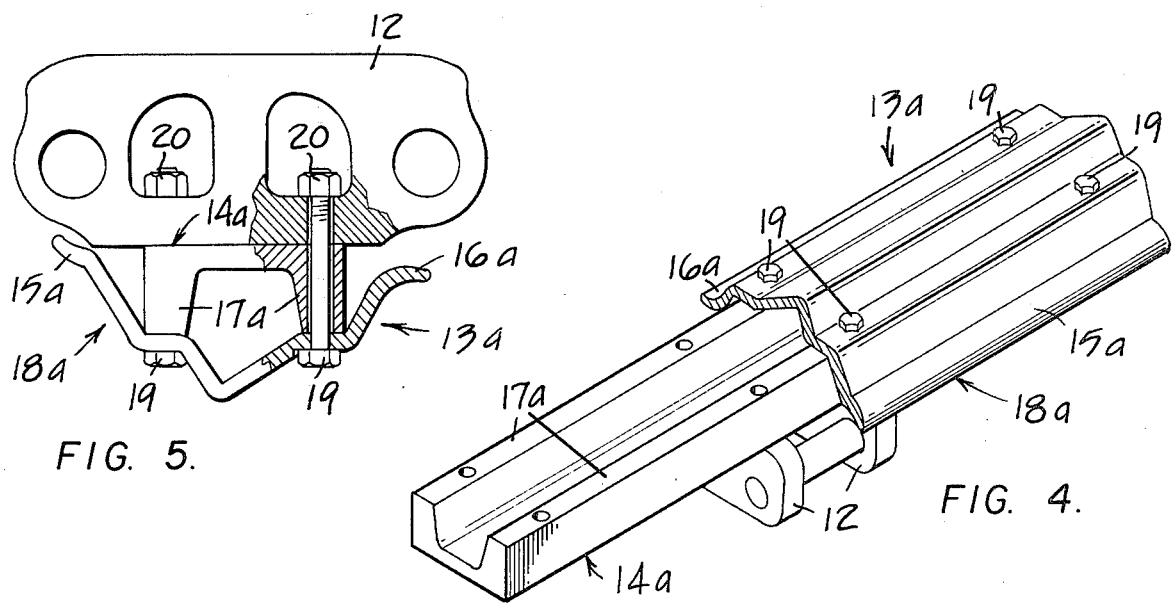

TWO-COMPONENT TRACK SHOE

BACKGROUND OF THE INVENTION

Track-type tractors are adapted to operate over "soft" soils, such as peat and volcanic ash, which give rise to flotation and traction problems. One solution to this problem constitutes the widening of the track shoes to thus provide substantial surface contact and low-pressure engagement with the ground. Examples of such track shoes are disclosed in U.S. Pat. Nos. 3,937,529 and 4,005,912, both assigned to the assignee of this application. It has proven further desirable to provide an apex portion on the track shoe to aid in the tractive effort thereof and to construct the track shoe economically and with the capability of being converted into a standard track shoe should the need arise.

SUMMARY OF THIS INVENTION

The present invention is directed to overcoming one or more of the above problems as set forth above.

The improved track shoe of this invention comprises a base having a pair of laterally spaced supports disposed in upstanding relationship thereon and a track plate disposed on the supports. The base and track plate are adapted to be releasably connected together by fastening means, such as a plurality of bolts extending therethrough. In a first embodiment of this invention, lugs are formed on lateral sides of the base whereas in a second embodiment the lugs are formed on the track plate.

BRIEF DESCRIPTION OF THE DRAWINGS

Other objects of this invention will become apparent from the following description and accompanying drawings wherein:

FIG. 1 partially illustrates an endless track assembly comprising a plurality of track shoes of this invention pivotally interconnected together by a link assembly;

FIG. 2 is a bottom plan view of a track shoe having a link of the link assembly secured thereto;

FIG. 3 is a transverse sectional view of the track shoe and link, taken in the direction of arrows III—III in FIG. 1;

FIG. 4 is a view similar to FIG. 2, but illustrating a modification of the track shoe; and FIG. 5 is a transverse sectional view of the FIG. 4 track shoe.

DETAILED DESCRIPTION

FIG. 1 partially illustrates an endless track assembly 10 comprising an articulated link assembly 11 having a plurality of links 12, each secured to a respective track shoe 13. As more clearly shown in FIGS. 2 and 3, each track shoe comprises a base 14 having lugs 15 and 16 formed integrally on opposite sides and extending the full width thereof. The lugs of each adjacent pair of track shoes function in a conventional manner to continuously overlap each other during operation of the track assembly.

A pair of laterally spaced supports 17 are disposed in upstanding relationship on base 14. The supports at least span links 12 and preferably extend the full width of the track shoe. The supports are in the form of conventional grousers whereby removal of a track plate 18, disposed on the supports, will adapt the track assembly for use in a conventional manner.

Track plate 18 is releasably secured to the base by a plurality of fastening means, each comprising a bolt 19 having a nut 20 threadably mounted on an end thereof. As more clearly shown in FIG. 3, each bolt extends through track plate 18, a respective support 17 and a bridging portion of track link 12. Track plate 18 comprises an apex portion 21 and a pair of sidewalls diverging away from each other and from apex portion 18.

The sidewalls respectively terminate in close proximity to lugs 15 and 16. Each sidewall comprises first and second angled sidewall portions 22 and 23 connected together by a flat intermediate portion 24. The head of each bolt 19 is disposed on such intermediate portion of the track plate.

FIGS. 4 and 5 illustrate a modified track shoe 13a wherein identical numerals depict corresponding constructions, but with numerals depicting modified constructions being accompanied by an "a".

Track shoe 10a essentially differs from the FIGS. 1–3 track shoe in that lugs 15a and 16a are formed integrally on a track plate 18a rather than on a base 14a of the track shoe. Base 14a thus has an abbreviated length and is generally U-shaped to include a pair of upstanding supports 17a. Bolts 19 each extend through track plate 18a, a respective support 17a and a bridging portion of track link 12 to secure the track shoe in place on the link assembly in the manner described above.

As suggested above, bases 14 and 14a need only span links 12 to accommodate bolts 19. However, the illustrated embodiments, wherein the bases extend the full widths of the respective track shoes further increase the structural integrity and bending resistance thereof.

The embodiments of the invention in which an exclusive property or privilege is claimed are defined as follows:

1. An endless track assembly for a track-type vehicle comprising
   an articulated link assembly including a plurality of pivotally interconnected links,
   a track shoe releasably connected to each pair of laterally spaced links of said link assembly comprising
   a base having a pair of laterally spaced supports disposed in upstanding relationship thereon, each of said supports extending at least substantially the full width of said track shoe,
   a track plate disposed on said supports, and
   a lug disposed on each lateral side of said track shoe and extending outwardly therefrom, and
   fastening means extending through said track plate, each of said supports and said base and each of said pair of links for releasably securing said track shoe to said link assembly.

2. The endless track assembly of claim 1 wherein said fastening means comprises a plurality of bolts.

3. The endless track assembly of claim 1 wherein said track plate comprises an apex portion and a pair of sidewalls disposed in diverging relationship relative to each other and extending away from said apex portion.

4. The endless track assembly of claim 3 wherein each of said sidewalls comprises a pair of angled sidewall portions and a flat intermediate portion connected between said sidewall portions and wherein said fastening means comprises at least one bolt having a head thereof disposed on said intermediate portion.

5. The endless track assembly of claim 1 wherein said lug is formed integrally on said base.

6. The endless track assembly of claim 1 wherein said lug is formed integrally on said track plate.

7. A two-component track shoe adapted for use in an endless track assembly constituting
- a base having a pair of laterally spaced supports formed integrally and disposed in upstanding relationship thereon,
- a track plate disposed on said supports, said track plate comprising an apex portion and a pair of sidewalls disposed in diverging relationship relative to each other and extending away from said apex portion, and
- a lug disposed on each lateral side of said track shoe and extending at least substantially the full width thereof.

8. The track shoe of claim 7 further comprising means defining aligned bores formed through said track plate and each of said supports and said base adapted to receive a bolt therethrough for securing said track shoe to an endless track assembly.

9. The track shoe of claim 8 further comprising a bolt extending through said aligned bores.

10. The track shoe of claim 7 wherein each of said supports extends at least substantially the full width of said track shoe.

11. The track shoe of claim 7 wherein each of said sidewalls comprises a pair of angled sidewall portions and an intermediate flat portion connected between said sidewall portions adapted to have a head of a bolt disposed thereon.

12. The track shoe of claim 3 wherein said lug is formed integrally on said base.

13. The track shoe of claim 7 wherein said lug is formed integrally on said track plate.

14. An endless track assembly for a track-type vehicle comprising
- an articulated link assembly including a plurality of pivotally interconnected links,
- a track shoe releasably connected to each pair of laterally spaced links of said link assembly comprising
- a base having a pair of laterally spaced supports disposed in upstanding relationship thereon,
- a track plate disposed on said supports, said track plate comprising an apex portion and a pair of sidewalls disposed in diverging relationship relative to each other and extending away from said apex portion, and
- a lug disposed on each lateral side of said track shoe and extending outwardly therefrom, and
- fastening means extending through said track plate, each of said supports and said base and each of said pair of links for releasably securing said track shoe to said link assembly.

15. A two-component track shoe adapted for use in an endless track assembly constituting
- a base having a pair of laterally spaced supports formed integrally and disposed in upstanding relationship thereon, each of said supports extending at least substantially the full width of said track shoe,
- a track plate disposed on said supports, and
- a lug disposed on each lateral side of said track shoe and extending at least substantially the full width thereof.

* * * * *